United States Patent
Maerz et al.

(10) Patent No.: US 8,840,054 B2
(45) Date of Patent: Sep. 23, 2014

(54) ADJUSTABLE FISHING REEL HOUSING WITH INTERCHANGEABLE DIFFERENT SIZE SPOOLS

(75) Inventors: Stephen Maerz, Strathmore (CA); Michael Thomas Sutherland, Calgary (CA); Lawrence Ralph Thomas, Priddis (CA)

(73) Assignee: 1069416 AB Ltd., Calgary, Alberta (CA)

( * ) Notice: Subject to any disclaimer, the term of this patent is extended or adjusted under 35 U.S.C. 154(b) by 607 days.

(21) Appl. No.: 13/152,043

(22) Filed: Jun. 2, 2011

(65) Prior Publication Data
US 2012/0055070 A1 Mar. 8, 2012

(30) Foreign Application Priority Data
Sep. 3, 2010 (CA) ..................................... 2714256

(51) Int. Cl.
*A01K 89/01* (2006.01)
*A01K 89/016* (2006.01)

(52) U.S. Cl.
CPC ..................................... *A01K 89/016* (2013.01)
USPC ........................................ 242/322; 242/317

(58) Field of Classification Search
USPC .......... 242/322, 310, 311, 312, 316, 317, 318
See application file for complete search history.

(56) References Cited

U.S. PATENT DOCUMENTS

| | | | |
|---|---|---|---|
| 812,023 A * | 2/1906 | Dickson | 242/303 |
| 2,261,629 A * | 11/1941 | Murphy | 43/18.1 R |
| 2,692,093 A * | 10/1954 | Tengesdal | 242/229 |
| 3,478,976 A * | 11/1969 | Sarah | 242/270 |
| 3,510,083 A * | 5/1970 | Cook | 242/295 |
| 3,784,124 A * | 1/1974 | Shumate et al. | 242/297 |
| 3,806,060 A * | 4/1974 | Valentine | 242/255 |
| 4,966,336 A | 10/1990 | Humble et al. | |
| 5,078,334 A | 1/1992 | Zanon | |
| 5,120,003 A | 6/1992 | Sacconi | |
| 5,407,144 A | 4/1995 | Ryall | |
| 5,556,049 A | 9/1996 | Bennett et al. | |
| 5,755,391 A | 5/1998 | Sacconi | |

(Continued)

FOREIGN PATENT DOCUMENTS

GB 853181 11/1960

OTHER PUBLICATIONS

"The Trilogy," Limited Edition Reel from Ari 't Hart (The Netherlands), 3 pages, copyright 2010.

(Continued)

*Primary Examiner* — Emmanuel M Marcelo
(74) *Attorney, Agent, or Firm* — Harness, Dickey & Pierce, P.L.C.

(57) ABSTRACT

A fishing reel housing for attachment to a rod along a longitudinal rod axis. The housing has a shaft for accepting a central bore of a line dispensing spool and an adjustment mechanism for selectively adjusting the shaft in position transversely away from the rod axis while maintaining its position along the rod axis. A fishing reel comprises the reel housing with a spool with a central bore mounted thereon. A fishing apparatus comprises at least one rod having a mount to support a fishing reel thereon with the reel mounted on thereon. A kit comprises the reel housing and at least one line dispensing spool having a central bore for mounting on the shaft of the fishing reel housing and may comprise one or more rods, lines and/or lures.

34 Claims, 11 Drawing Sheets

(56) References Cited

U.S. PATENT DOCUMENTS

| | | | |
|---|---|---|---|
| 5,911,378 | A | 6/1999 | Plestan |
| 5,918,826 | A | 7/1999 | Arkowski |
| 5,947,398 | A * | 9/1999 | Yeh ............................ 242/295 |
| 6,032,894 | A | 3/2000 | Chapman et al. |
| 6,045,077 | A | 4/2000 | Bernard et al. |
| 6,065,699 | A | 5/2000 | Sacconi |
| 6,286,772 | B1 | 9/2001 | Koelewyn |
| 6,641,071 | B1 * | 11/2003 | Yeh ............................ 242/317 |
| 6,851,637 | B2 | 2/2005 | Gilmore |
| 6,871,809 | B2 | 3/2005 | Psaros |
| 7,077,350 | B2 | 7/2006 | Koelewyn |
| 7,188,795 | B2 * | 3/2007 | Maeder ....................... 242/322 |
| 7,195,188 | B2 * | 3/2007 | Maeder ....................... 242/322 |
| 7,377,070 | B2 * | 5/2008 | Bingham ........................ 43/22 |
| 2002/0104912 | A1 * | 8/2002 | Bascue, Jr. ................. 242/317 |
| 2004/0069886 | A1 * | 4/2004 | Maeder ....................... 242/322 |
| 2006/0163403 | A1 | 7/2006 | Dickson |
| 2007/0176036 | A1 * | 8/2007 | Venes ......................... 242/322 |
| 2008/0191080 | A1 * | 8/2008 | Shalosky ..................... 242/323 |

OTHER PUBLICATIONS

Canadian Office Action issued Oct. 18, 2012 for counterpart Canadian Patent Application No. 2,714,256, 2 pages.

* cited by examiner

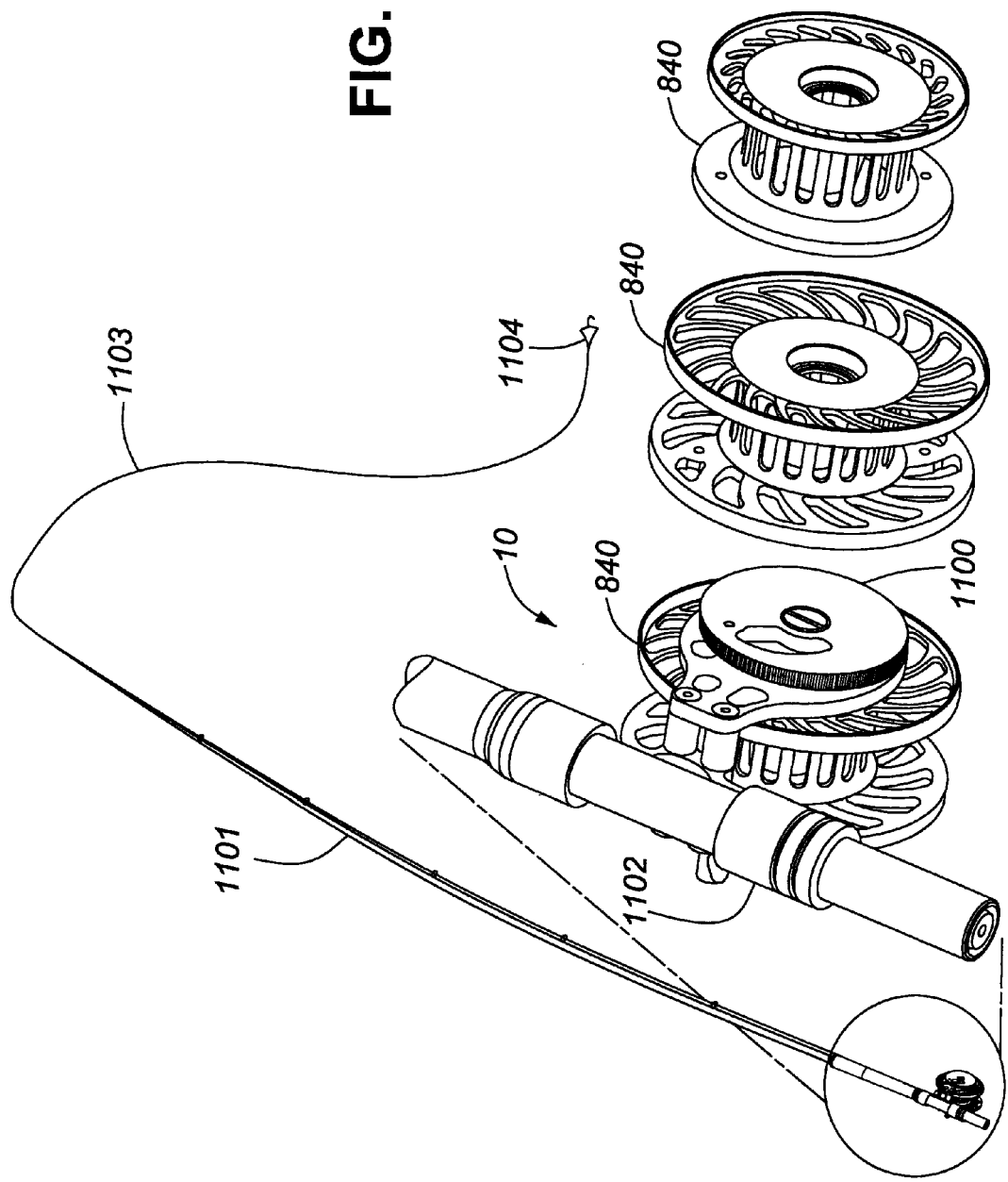

ADJUSTABLE FISHING REEL HOUSING WITH INTERCHANGEABLE DIFFERENT SIZE SPOOLS

RELATED APPLICATION

The present disclosure claims priority from Canadian Patent Application No. 2,714,256 filed Sep. 3, 2010, which is incorporated by reference in its entirety herein.

TECHNICAL FIELD

The present disclosure relates to fishing reels and in particular to a fly fishing reel housing with interchangeable different size spools.

INTRODUCTION

Fly-fishing is a traditional pastime that is enjoying a modern resurgence. It combines aspects of solitude, proximity to nature, patience and skill to provide a relaxing break from the day to day hubbub of life, not only during the fishing activity, which takes place near or in streams and rivers, but in the practice of designing and tying lures designed to look like flies and attract the attention of a fish. The lures or flies are typically left to float on the water surface, suspended just below the water surface or retrieved through the water at varying water column depths at the end of a length of line extending from a reel on a fly fishing rod. The flies are moved from place to place by manipulation or movement of the rod and subsequently the line, to reposition the line and fly on or in the water body, without retracting and casting out line as is done in other fishing techniques.

Those adept at fly-fishing typically match the size and weight of the fly line to the type of fishing being undertaken. Conventionally, fly lines may be obtained in many sizes from 2 to 11 or larger, with 2 being the lightest and thinnest and 11 being much heavier and thicker. Fly reels are generally sized to accommodate the particular line size and may come in one of five standard sizes, to accept spools of line of size 2-3, 4-5, 6-7, 8-9 and 10-11, each having a different (respectively increasing) diameter. Fly rods are typically sized to accommodate a single reel size and the weighting of the reel relative to the rod and the reel's position along the length of the rod may affect the fishing performance. Thus, a full fly fishing "kit" may comprise a plurality of rods, reels, spools of line and flies, which may be inconvenient, especially if trekking to a remote area where amount and weight of baggage is a consideration and/or where one expects to fish different waters for varying sizes of fish on the same fishing excursion.

BRIEF DESCRIPTION OF THE DRAWINGS

FIG. 11 is a representational drawing showing an example embodiment of the reel housing of FIG. 1 mounted on a rod with line and fly, with additional spools.

Like reference numerals are used in the drawings to denote like elements and features.

DESCRIPTION

The present disclosure provides an example embodiment of a fly reel housing with interchangeable line dispensing spools of different size. The single reel housing adjusts to accommodate different sized spools including four of the most commonly used of the five standard sizes. The reel housing comprises a track and a trefoil stabilizer adapted to have a spool mounted on a central shaft thereon.

The vertices of the stabilizer follow a double arcuate race or profile within the track such that positioning the stabilizer at specific portions of the profile cause the shaft, on which the spool is mounted, to be disposed transversely from a longitudinal rod axis along which a rod mount extends for attaching the reel housing to a fly rod, at different separations, in order to accommodate the different size spools, while maintaining the longitudinal position of the shaft along the rod axis.

The shaft thus moves different distances perpendicularly away from the fly rod to accommodate different sized spools of line, but does not move longitudinally along the length of the fly rod so that the weight distribution of the rod/reel combination remains substantially unaffected by the insertion of different sized spools of line.

Detents are provided in the reel housing to indexed positions of the stabilizer corresponding to each of the four standard sized spools.

Figure 1:
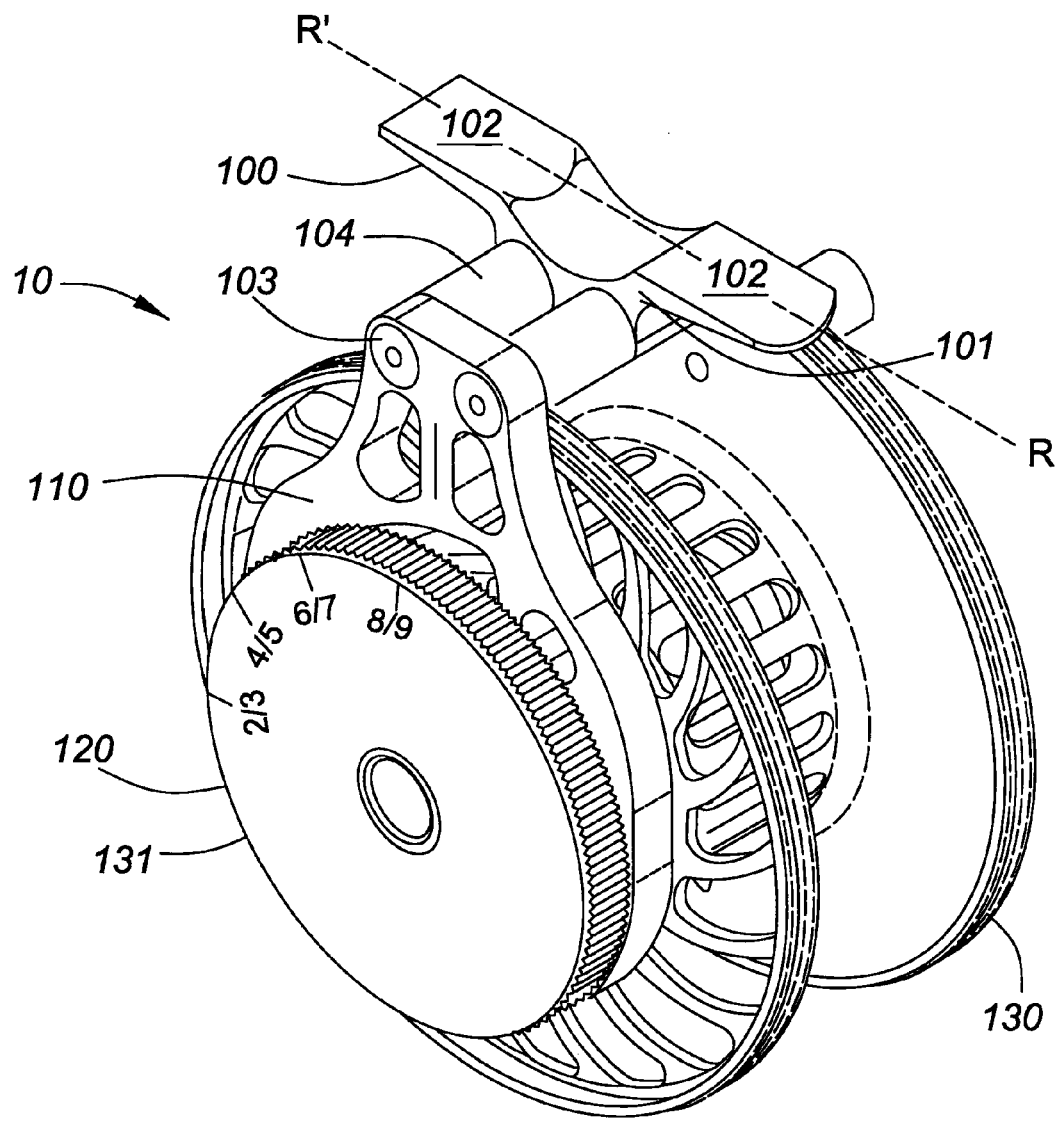
FIG. 1 is a front perspective view of a reel housing with removable spool according to an example embodiment of the present disclosure.

Turning now to FIG. 1, there is shown a perspective view of a reel housing with removable spool according to an example embodiment of the present disclosure. For purposes of description only, the view shown in FIG. 1 is designated the front view. The reel housing, shown generally at 10, comprises a rod mount 100, a track 110 and an adjustment assembly 120. The reel housing 10 accepts one of a number of different sized spool assemblies 130.

The rod mount 100 is a conventional rod mount adapted to releasably engage a fly rod (not shown). In some example embodiments, the rod mount 100 comprises a base 101 extending from two feet 102 extending longitudinally along a rod axis R-R'. In some example embodiments, each of the feet 102 are sized to lie against the rod (not shown) and be releasably attached thereto by a threaded mount (not shown) on the rod (not shown).

In some example embodiments, when a different sized spool assembly 130 is installed in the reel housing 10, the reel housing 10 may be dismounted from the rod (not shown) having a size corresponding to the previous spool assembly 130 and mounted onto a rod (not shown) that corresponds to the size of the newly installed spool assembly.

The base 101 has a plurality of bores to accommodate screws 103 that rigidly fasten the track 110 to the base 101. In some example embodiments, the track 110 and the base 101 are spaced apart by a plurality of standoff spacers 104 to permit the spool assembly 130 to be mounted in offset fashion relative to the rod axis R-R' such that the combined weight of the reel housing 10, the spool assembly 130 and line (not shown) is relatively evenly distributed on either side of the rod axis R-R'.

Figure 2:
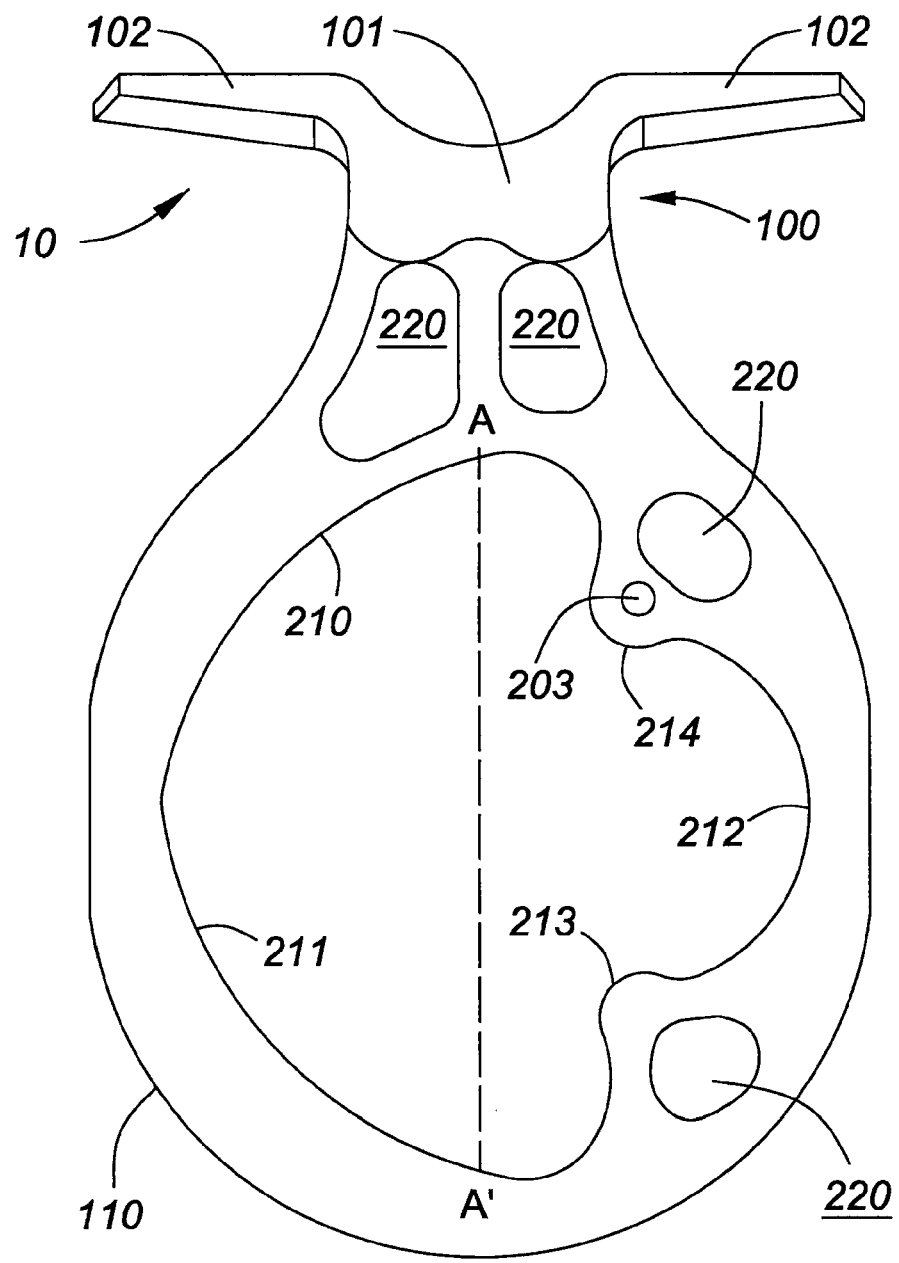
FIG. 2 is a front cross-sectional view of the configuration of the rod mount and the track of the example embodiment of FIG. 1.
Figure 3:
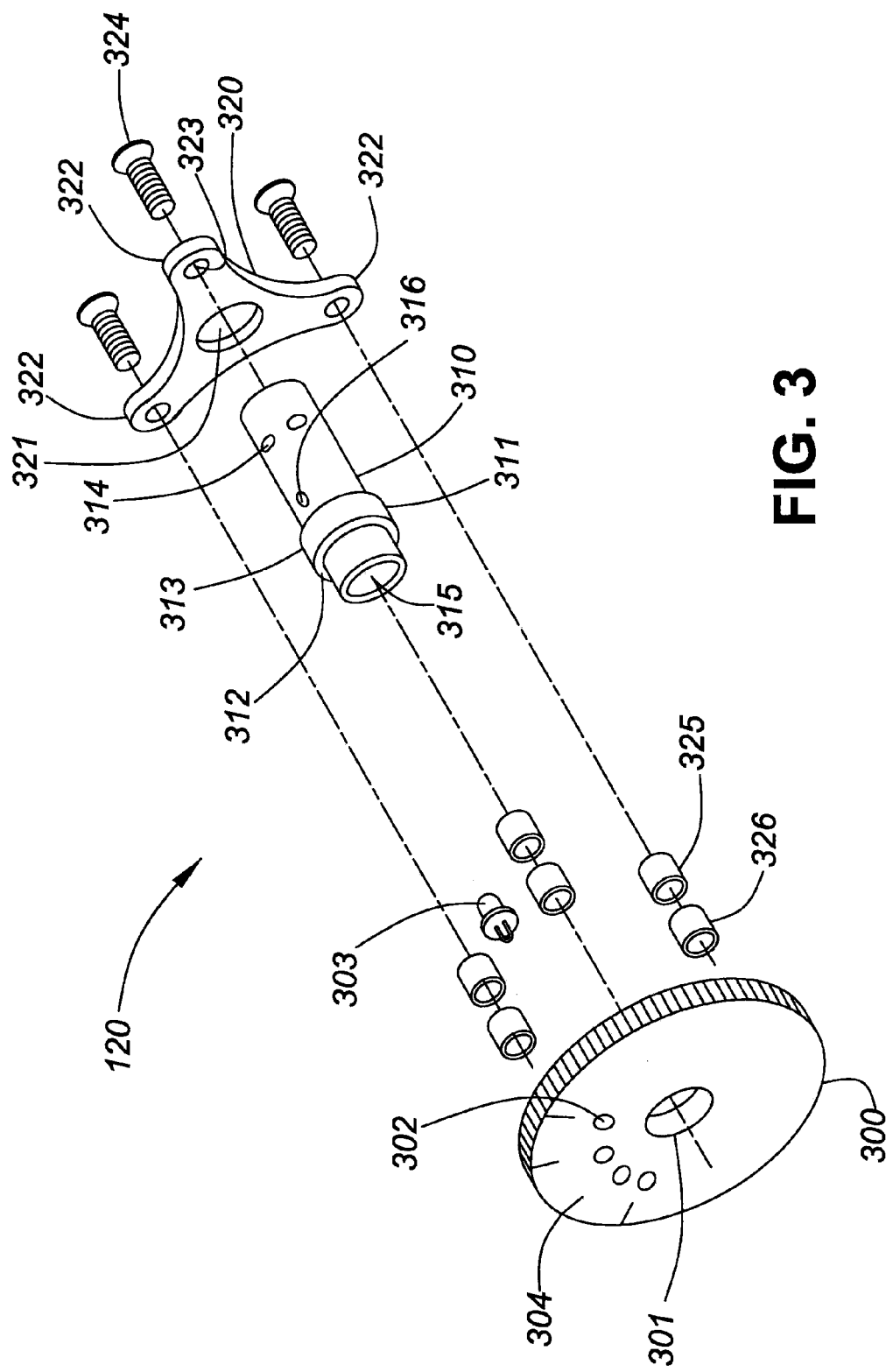
FIG. 3 is an exploded front perspective view of the adjustment assembly of the example embodiment of FIG. 1.
Figure 4:
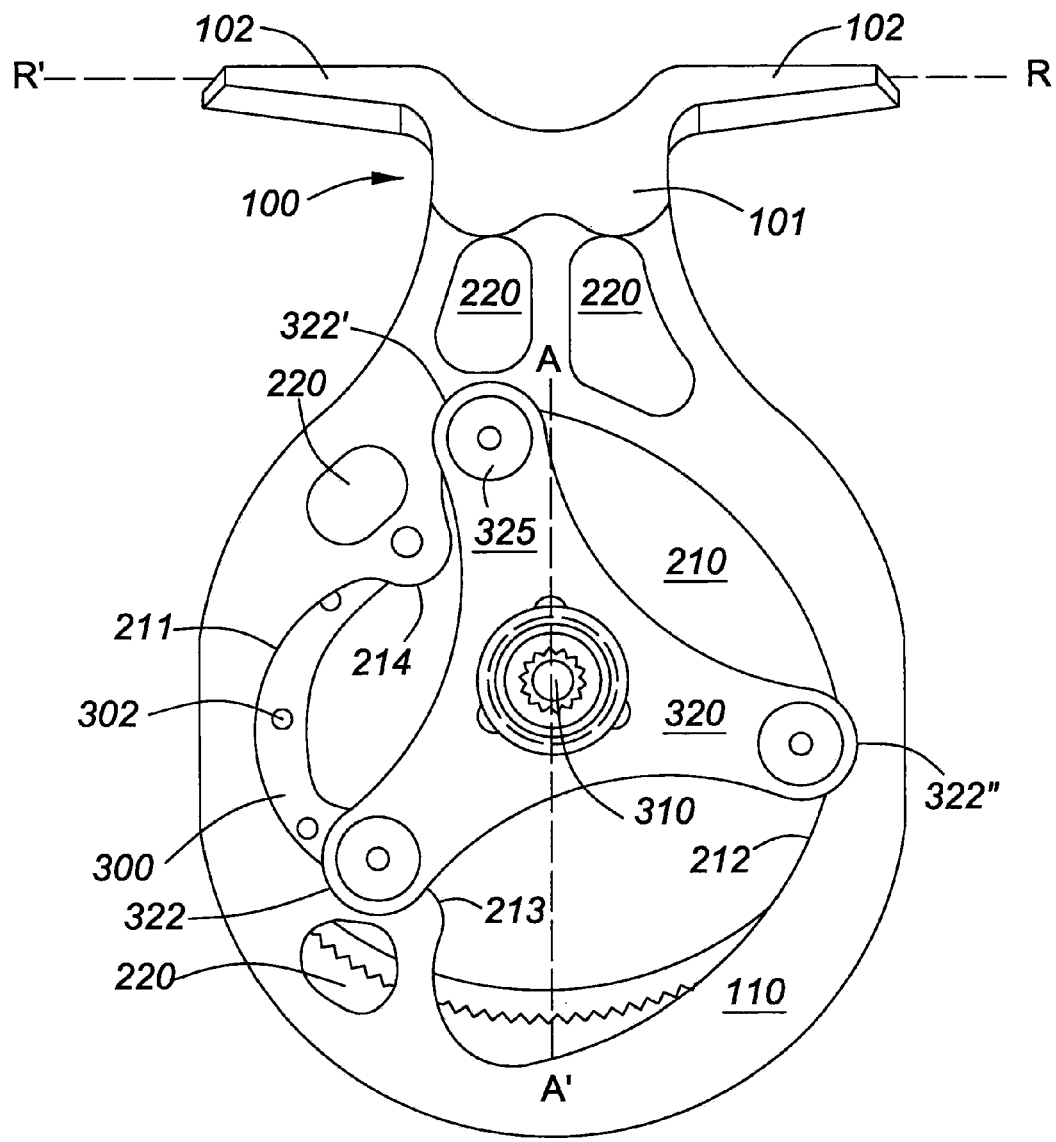
FIG. 4 is a rear cross-sectional view of the position of the stabilizer of the example embodiment of FIG. 3 relative to the track at the predetermined adjustment position corresponding to a standard size spool of size 2-3.

Turning now to FIG. 2, there is shown in a front cross-sectional view, the configuration of the rod mount 100 and the track 110. The track 110 comprises a plate having an inner race or bore 210 passing therethrough. The inner race 210 defines a travel path to be followed by legs 322, 322', 322" of a stabilizer 320 (FIGS. 4-7) of the adjustment assembly 120 as shown in FIG. 3. The pattern of the inner race 210 is chosen in conjunction with a particular configuration of the stabilizer 320 such that, as the stabilizer 320 traverses the inner race 210 each of the legs 322, 322', 322" of the stabilizer 320 remain in contact at all times with the inner race 210 and a shaft 310 of the adjustment assembly 120 passing through a central bore 321 (FIG. 3) of the stabilizer 320 moves transversely toward or away from the rod axis R-R' along transverse axis A-A' while maintaining substantially the same longitudinal position, that is, without moving longitudinally, along the rod axis R-R'. In other words, the shaft 310 moves toward and away from the rod (not shown) but not along the length of the rod.

In some example embodiments, the inner race 210 may be described as consisting substantially of two convex arcs 211, 212 of different diameter, mutually terminating at a pair of protrusions 213, 214.

In addition to the inner race 210, the track 110 may contain one or more secondary bores 220 to remove material and reduce the weight of the reel housing 10. The track 110 in some example embodiments extends only slightly beyond the inner race 210 so as to provide support as the stabilizer 320 traverses its perimeter, without adding additional weight to the reel housing 10.

In some example embodiments, a bore 203 (FIG. 2) is sized to accept a spring loaded ball plunger 303 (FIG. 3).

Figure 8:
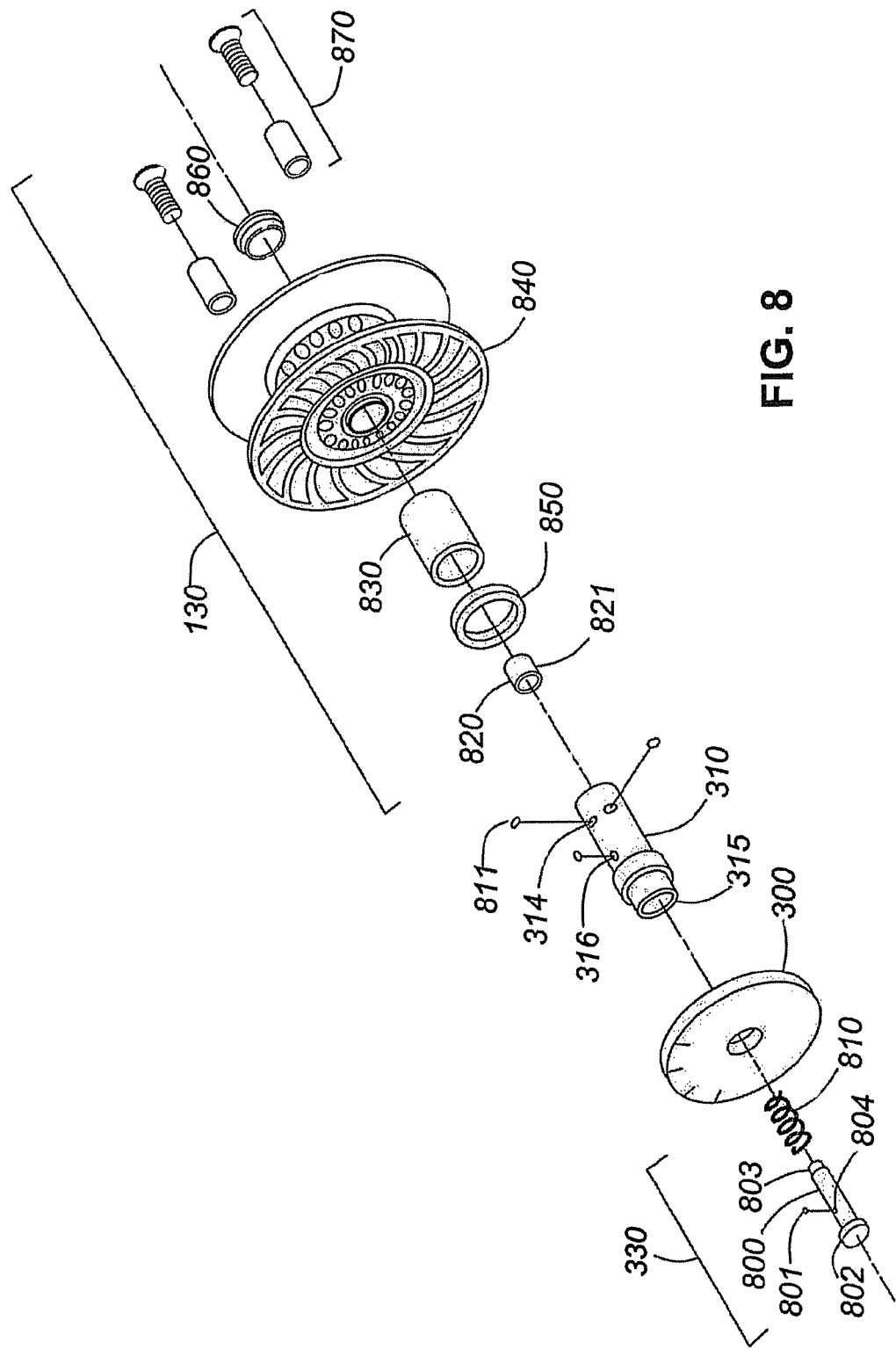
FIG. 8 is an exploded front perspective view of the spool assembly of the example embodiment of FIG. 1.

FIG. 3 shows the adjustment assembly 120 in an exploded front perspective view. It comprises a dial or knob 300, a shaft 310, a stabilizer 320, and a release 330 as shown in FIG. 8.

Dial 300 is a disk having a central bore 301 passing therethrough. The central bore 301 is sized to accept a portion of the shaft 310 so as to permit the dial 300 to be seated thereon and to rotate with the shaft 310.

As the dial 300 is rotated, it causes the adjustment assembly 120 to expand or contract the distance between the shaft 310 and the rod axis R-R' along transverse axis A-A' to accommodate different size fly spools 130 while maintaining substantially the same longitudinal position along the rod axis R-R'.

In some example embodiments, the dial 300 has markings 304 on an exposed surface such as the front surface corresponding to pre-determined adjustment positions at which the adjustment assembly 120 may accommodate different standard size fly spools 130. In some example embodiments, these may correspond to the conventional ⅔, ⅘, 6/7 and ⅝ sizes of spool 130.

In some example embodiments, the pre-determined adjustment positions have associated detents 302 (shown in phantom in FIG. 3 and better seen in FIGS. 4-7) drilled into a back surface of the dial 300 at set intervals. In some example embodiments, the detents 302 are drilled along a radial line from each corresponding marking on the exposed surface and a constant distance from the perimeter of the dial 300 to accept a ball from a spring loaded ball plunger 303 to provide a positive locking position at each pre-determined adjustment position.

The distance from the perimeter of the dial 300 varies for each detent because the position of the shaft 310 varies with rotation of the dial 300. The spring in the ball plunger 303 forces the ball against the back surface of the dial 300. Rotating the dial 300 about the shaft 310 involves relatively minor torque while the ball is passing between adjacent detents 302. When the next detented position is reached, the ball is forced into the detent by the spring from the ball plunger 303, providing a "clicked" locking position corresponding to the pre-determined adjustment position for a standard size fly spool 130. The dial 300 may be displaced from this position by the application of a greater amount of rotational torque to force the ball out of the detent and against the biasing force of the spring in the ball plunger 303. The size of the ball and spring of the ball plunger 303 and the size of the detents 302 are selected to permit a positive "clicked" locking position at each adjustment position and a suitable torque level to move the dial 300 from a first such locking position to the next. In some example embodiments a plurality of ball plungers 303 and detents 302 may be employed for different adjustment positions or to provide more secure locking positions or both.

Shaft 310 is a substantially hollow cylindrical tube having a longitudinal bore 315 passing therethrough. Proximate to one end, it has an intermediate portion 311 of increased outer diameter that defines a pair of shoulders 312, 313 against which the central bore 301 of the dial 300 and a central bore 321 of the stabilizer 320 may be seated.

When central bore 301 of dial 300 is seated on shoulder 312, shaft 310 passes through central bore 301, presenting longitudinal bore 315 to the surface of dial 300.

Shaft 310 has a plurality of guide holes 314 drilled radially into the portion of the shaft 310 that extends through and past the stabilizer 320, a common distance from the distal end of the shaft 310. The guide holes 314 are formed to accept and retain balls 811 (FIG. 8) to provide a quick release mechanism to the spool assembly 130 as described later. In some example embodiments, a further guide hole 316 passes entirely through shaft 310 into longitudinal bore 315 at a point between the guide holes 314 and intermediate portion 311 to accept and retain a lock pin 801 (FIG. 8) transversely through longitudinal bore 315.

In some example embodiments, a portion of longitudinal bore 315, on the same side of guide holes 314 as intermediate portion 311, is of decreased diameter and a portion of longitudinal bore 315, on the other side of guide holes 314 from intermediate portion 311, is of increased diameter, so as to present internal projections 1017, 1018 (FIG. 10) within longitudinal bore 315 on either side of guide holes 314.

Stabilizer 320 is a multi-legged structure with a central bore 321. The number of legs 322, 322', 322" is at least three. Each of the legs 322, 322', 322" has a peripheral bore 323 sized to accept a screw 324 to fasten a standoff stabilizer spacer 325 extending normally away from the plane of the stabilizer 320 to the inside face of dial 300. Dial 300 has a partial internal bore on its inside face with a female thread for engaging the male thread of screw 324, pinning stabilizer spacer 325 between them. The stabilizer spacers 325 are configured to fit inside and remain in contact with the inner race 210 of the track 110 and have substantially the same height as the track 110. In some example embodiments, the stabilizer spacers 325 are surrounded by a rotating bushing 326. Bushings 326 facilitate an easier rotation of stabilizer 320 to different detent positions, as bushing 326 is free to rotate about stabilizer spacer 325 while travelling along track 211, while stabilizer spacers 325 tend not to rotate because of the longitudinal pressure imposed on them by the screws 324 and the inside face of dial 300. The stabilizer 320, stabilizer spacers 325 and bushings 326 are sized and configured such that when the central bore 321 of the stabilizer 320 is seated against shoulder 313 of the shaft 310, each of the stabilizer spacers 325 and their surrounding bushings 326 are substantially coplanar with the track 110 and engage the inner race 210 of the track 110. In some example embodiments, the stabilizer 320 is in a trefoil shape with concave portions connecting legs 322, 322', 322".

The dial 300, having been fixed by screws 324 through stabilizer spacers 325 to stabilizer 320, is in fixed rotational engagement with the stabilizer 320 to ensure that the legs 322, 322', 322" of the stabilizer 320 move in conjunction with rotation of the dial 300 from one pre-determined adjustment position to another.

Because of the configuration of the inner race 210 of the track 110 and the corresponding configuration of the stabilizer 320, as the stabilizer spacers 325 traverse the inner race 210 of the track 110, the position of the shaft 310, moves closer and farther away from a point A (FIG. 2) on the perimeter 210 proximate to the feet 102 of the rod mount 100 but is constrained to remain along axis A-A' shown on FIG. 2, which is transverse to longitudinal rod axis R-R'.

Figure 5:
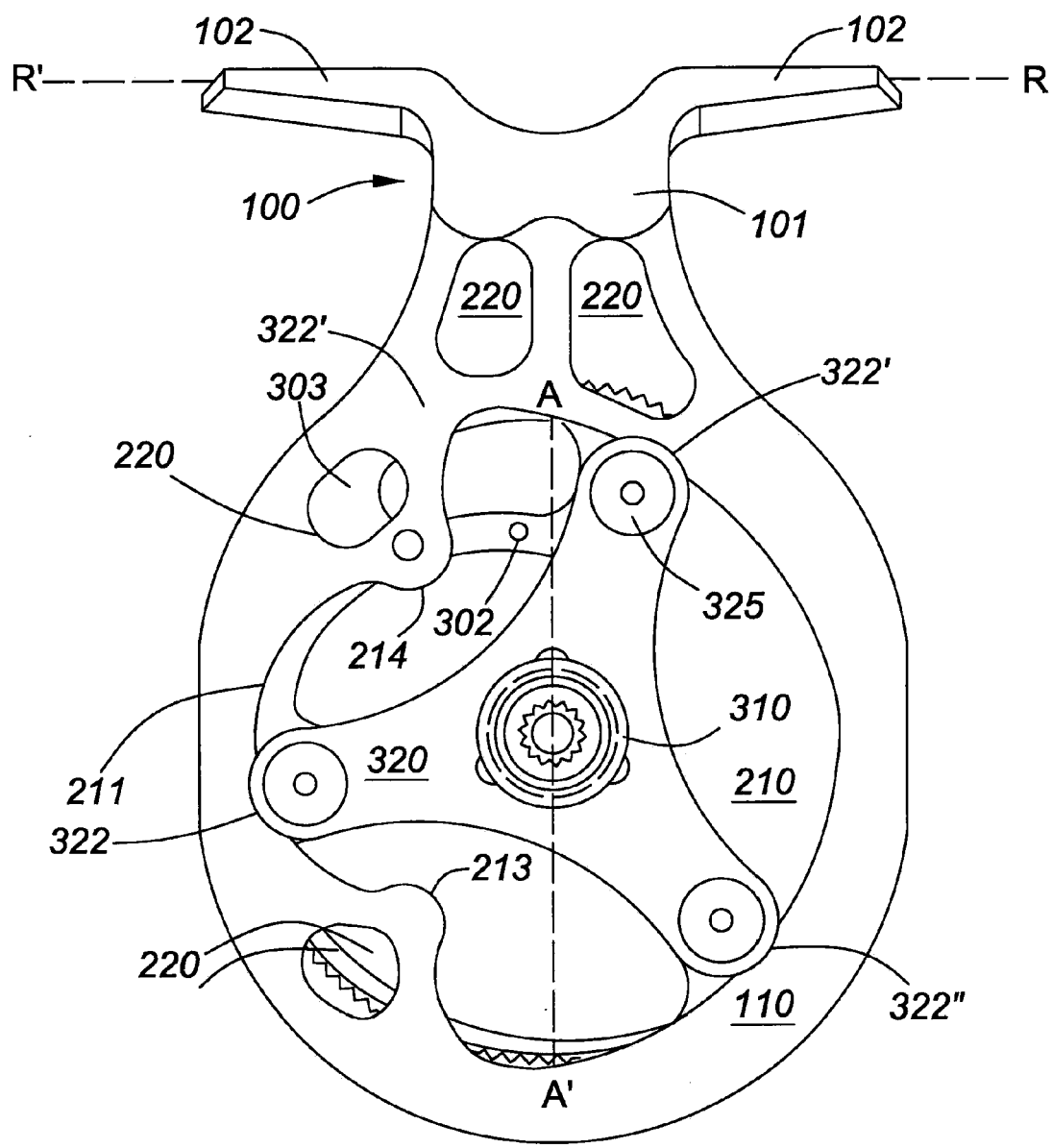
FIG. 5 is the cross-sectional view of FIG. 4, showing the position of the stabilizer of the example embodiment of FIG. 3 relative to the track at the predetermined adjustment position corresponding to a standard size spool of size 4-5.
Figure 6:
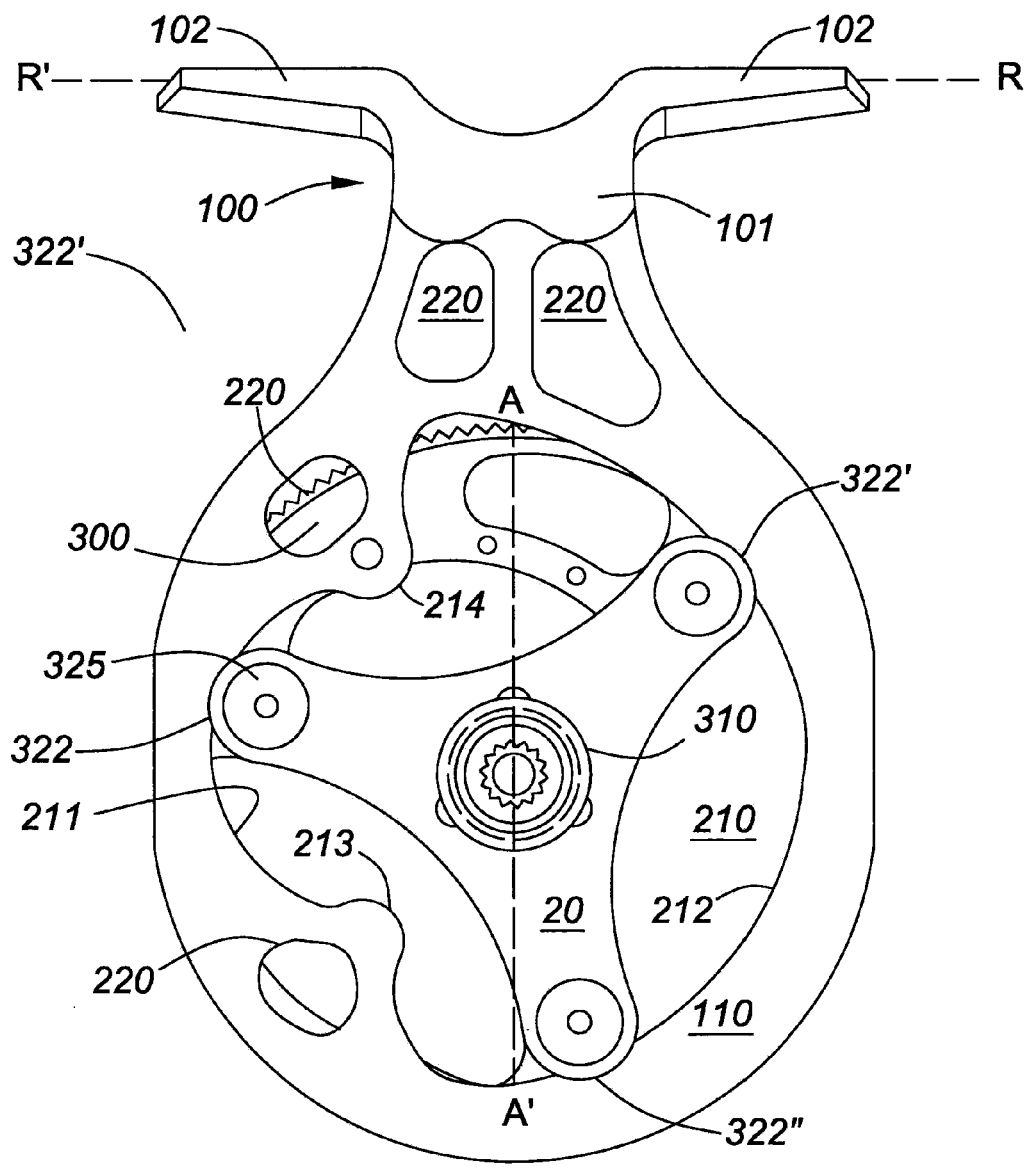
FIG. 6 is the cross-sectional view of FIG. 4, showing the position of the stabilizer of the example embodiment of FIG. 3 relative to the track at the predetermined adjustment position corresponding to a standard size spool of size 6-7.
Figure 7:
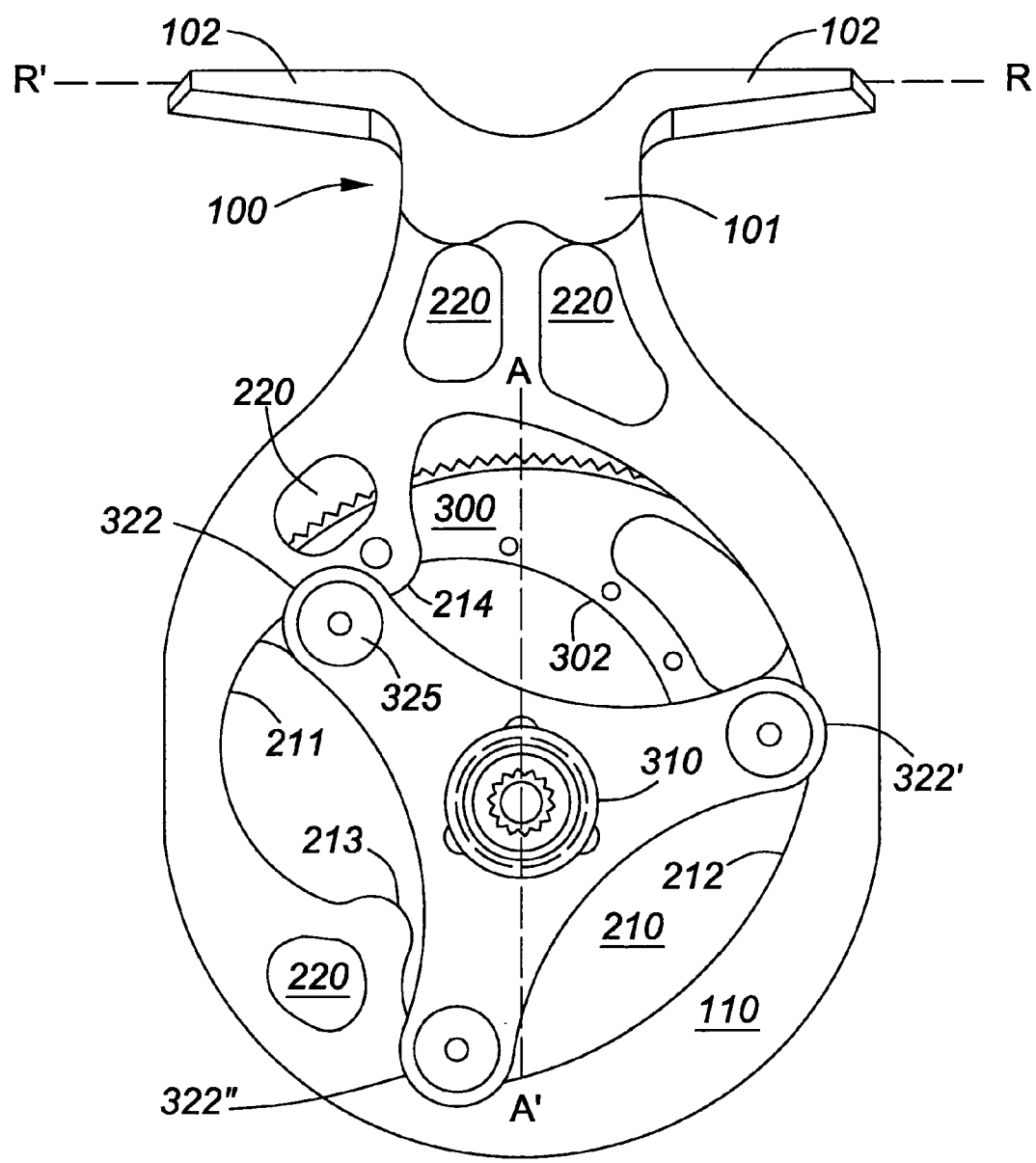
FIG. 7 is the cross-sectional view of FIG. 4, showing the position of the stabilizer of the example embodiment of FIG. 3 relative to the track at the predetermined adjustment position corresponding to a standard size spool of size 8-9.

This may be better seen in FIGS. 4-7, which show the position of the stabilizer 320 and spacers 325 relative to the perimeter 210 of the track 110 for each of the predetermined adjustment positions corresponding to standard size spool assembly 130 of size 2-3, 4-5, 6-7 and 8-9 respectively. Thus it may be seen that the legs 322, 322', 322" of the stabilizer 320 remain in contact at all times with the inner race 210 of the track 110. Under the guidance provided by the contact between the legs 322, 322', 322" of the stabilizer 320 and the inner race 210 of the track 110, as the dial 300 is moved between the predetermined adjustment positions, the shaft 310 is guided toward and away from longitudinal rod axis R-R'. When the dial 300 is at the 2-3 position (FIG. 4), shaft 310 is a minimal separation from longitudinal rod axis R-R'. When the dial 300 is at the 8-9 position (FIG. 7), shaft 310 is a maximum separation from longitudinal road axis R-R'. As shown in FIGS. 5 and 6, when the dial 300 is at the 4-5 or 6-7 position, shaft 310 is at respectively intermediate separations from longitudinal rod axis R-R'.

In some example embodiments, two of the legs 322' and 322" traverse along the larger arc 212, while a third one of the legs 322 traverses along the smaller arc 211. The relative diameters and extent of the two arcs 211, 212 are chosen to ensure that the shaft 310 substantially remains along transverse axis A-A'. That is, it maintains its longitudinal position along rod axis R-R' throughout.

In some example embodiments, the position of the stabilizer 320 and its legs 322' and 322" may be constrained from moving beyond the 2-3 position and the 8-9 position by protrusions 213, 214 which each define the end of the arcs 211, 212. In the 2-3 position, leg 322' traversing the smaller arc 211 abuts protrusion 213 while leg 322' traversing the larger arc 212 abuts protrusion 214. In the 8-9 position, the leg 322 traversing the smaller arc 211, abuts protrusion 214, while leg 322" traversing the larger arc 212 abuts protrusion 213.

FIG. 8 shows an exploded front perspective view of the spool assembly 130, together with shaft 310 and dial 300. Spool assembly 130 comprises a release pin 800 with elongate shaft 809, spring 810, balls 811, nut 820, spool bushing 830, spool 840, spool gear 850, spool shaft cap 860 and spool handle assemblies 870.

Figure 9:
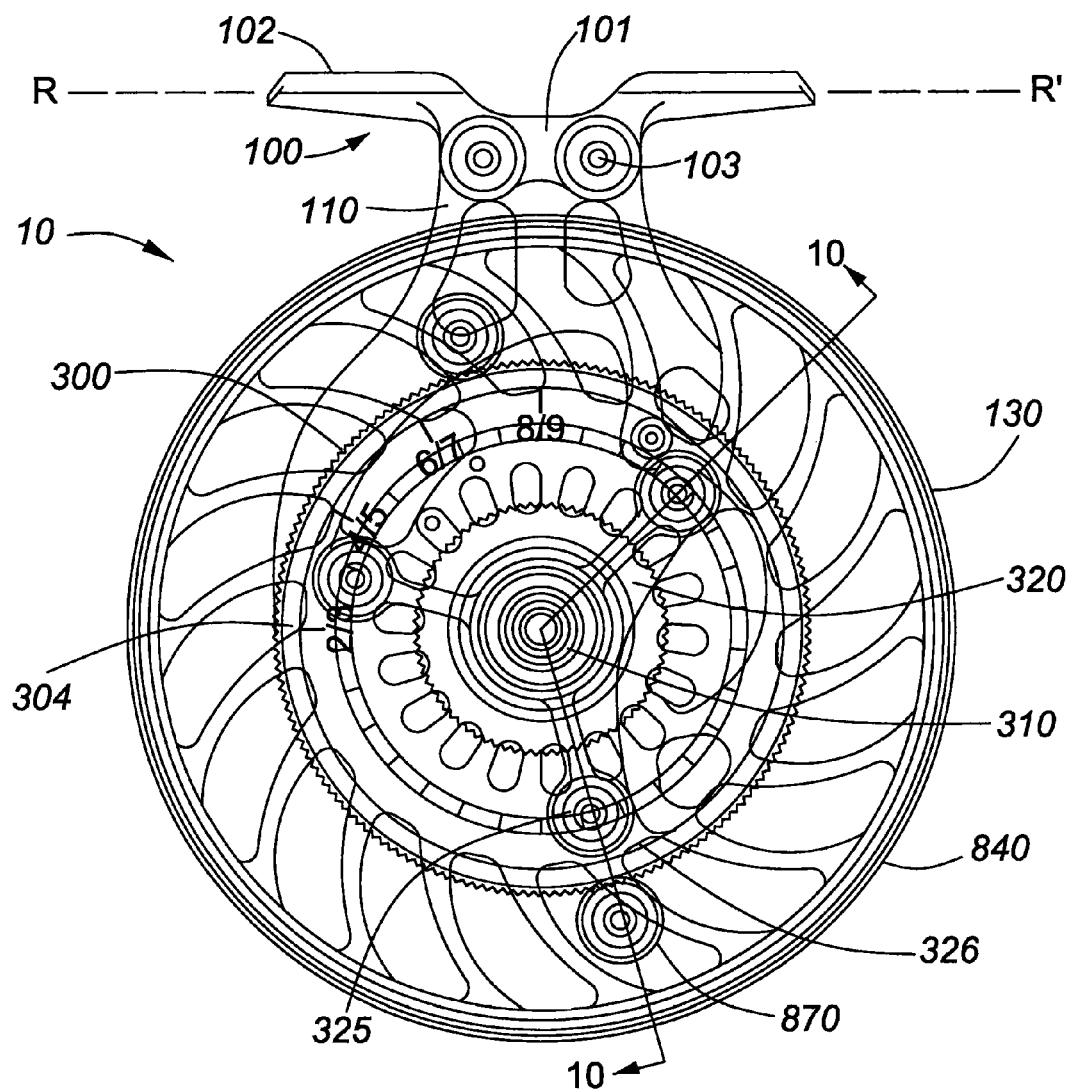
FIG. 9 is a front transparent view of the embodiment of FIG. 1 with a spool assembly for a spool of size 8-9 mounted thereon.

FIG. 9 shows a front transparent view of the reel housing 10 with spool assembly 130 having a size 8-9 spool 840 mounted thereon.

Figure 10:
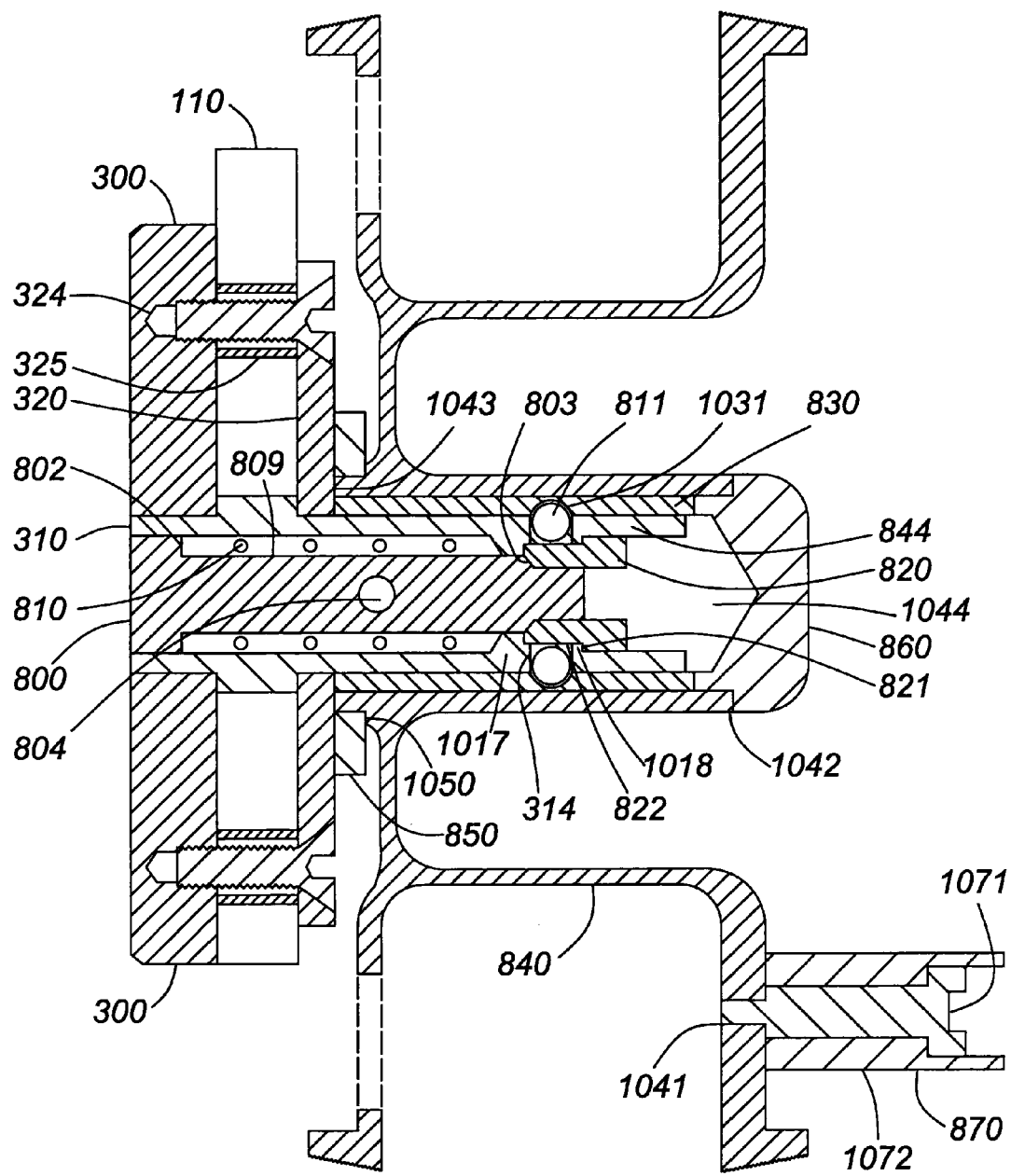
FIG. 10 is a right side cross-sectional view of the embodiment of FIG. 1 taken along section line 10-10 in FIG. 9.

As may be better seen in FIG. 10, which shows a right cross-sectional view of the reel housing 10 and spool assembly 130 taken along section line 10-10 in FIG. 9, release pin 800 passes through spring 810 and into longitudinal bore 315 of shaft 310 when seated within central bore 301 of dial 300. Release pin 800 has a shoulder 802 that is sized to allow spring 810 to be seated thereon and a shoulder 803 that is sized to allow nut 820 to be threaded thereon. In some example embodiments, bore hole 804 passes transversely through release pin 800 and sized to accommodate a lock pin 801 that is seated within hole 316 drilled transversely through shaft 310 and into longitudinal bore 315. When bore hole 804 is lined up with hole 316, lock pin 801 is installed through both holes providing a locking position that allows nut 820 to be screwed and tightened onto the end of release pin 800. Lock pin 801 does not form part of the working reel housing 10 but is employed to facilitate fastening nut 820 (discussed below) to release pin 800 and/or removal of nut 820 from release pin 800.

Spring 810 is sized to surround release pin 800 and be seated on shoulder 802 of release pin 800. Spring 810 is also sized to fit within longitudinal bore 315 of shaft 310 and be seated against internal projection 1017 when shaft 310 extends through central bore 301 of dial 300. Spring 810 biases release pin 800 away from central bore 300 but compresses with the application of pressure to allow release pin 800 to penetrate within longitudinal bore 315 of shaft 310.

Nut 820 is a hollow cylinder with a small external shoulder 821 abutting a surface 822 of reduced diameter. Nut 820 is sized to fit within the enlarged portion of longitudinal bore 315 of shaft 310 and abuts and engages internal projection 1018 of longitudinal bore 315 of shaft 310. Assembly and disassembly of nut 820 with and from release pin 800 is facilitated by lock pin 801.

Spool bushing 830 is a hollow cylindrical element sized to loosely fit around shaft 310 on the other side of stabilizer 320 from dial 300. It has an internal groove 1031 sized and positioned to accept the balls 811 seated in guide holes 314 so as to retain spool bushing 830 in position about shaft 310.

Spool 840 has an externally facing cylindrical channel 1041 around its perimeter adapted to accept a quantity of fishing line (not shown) and a transverse central cylinder 1042 with a bore 1044 sized to fit snugly over spool bushing 830. A gear mount 1043 adapted to accept spool gear 850 extends at a proximate end of the transverse central cylinder 1042. The distal end of transverse central cylinder 1042 is adapted to accommodate spool shaft cap 860.

Spool spur gear 850 is a planar annular gear sized to be press fit around spool 840 by means of a boss 1050 (FIG. 10) cut into the face of the spool 840. Teeth on the spool gear 850 generate drag by bearing up against a spring loaded wedge (not shown). The amount of drag is adjustable. Shaft cap 860 covers the open distal end of transverse central cylinder 1042 of spool 840.

Spool handle assembly 870 comprises a handle 1072 and a mounting screw 1071. Although only one spool handle assembly 870 is shown in FIG. 10, as may be seen from FIG. 8, a plurality of such spool handle assemblies 870 may be employed. The handle 1072 is positioned over a threaded bore in the cylindrical channel 1041 and is fastened to the spool 840 by mounting screw 1071. Because the handle 1072 is offset relative to the transverse central cylinder 1042, it may be used to wind and unwind line from the spool 840 in conventional fashion.

The operation of the reel housing 10 will now be described. In order to change from one size spool 840 to another, by way of non-limiting example, from a 2-3 spool to a 4-5 spool, the dial 300 is rotated from the 2-3 mark 304 to the 4-5 mark 304. The position of the 2-3 mark 304 and the 4-5 mark 304 are positively locked by the communication of the ball plunger 303 with the detents 302 on the back surface of the dial corresponding to these positions.

While the dial 300 is being rotated, the stabilizer 320, which is rotationally coupled to the dial 300 by screws 324 through stabilizer spacers 325, also rotates accordingly. In so doing, the spacers 325 and surrounding bushings 326 traverse (in the example scenario being discussed, counterclockwise relative to the front) the smaller and larger arcs 211, 212 defining the inner race 210 of the track 110. This causes the shaft 310 mounted in the central bore 321 of the stabilizer 320 to move along transverse axis A-A' (in the example scenario being discussed, away from point A) but not longitudinally along rod axis R-R', thus providing an increased space for the larger 4-5 spool 840 to be inserted in place of the smaller 2-3 spool 840 without affecting the weighting of the rod (not shown).

Once the adjustment has been made, the currently inserted 2-3 spool 840 may be removed. This is effected by depressing the release pin 800, which is outwardly biased by spring 810 and held in place by nut 820, abutting adjoining internal projection 1018. Ball 811 is jointly positioned on the horizontal flat of nut 820 and guide hole 314 on the interior surface of longitudinal bore 315, inwardly toward the reel housing 10. Ball 811 is also engaged in bushing groove 1031, and against surface of nut 820, preventing the spool from sliding off shaft 310. As the release pin 800 is depressed, spring 810 is compressed and shoulder 803 pushes nut 820 rearward, so that ball 811 engages the surface of elongate shaft 809, which is of lesser diameter than nut 820. This permits ball 811 to be radially inwardly displaced within guide hole 314. With groove 1031 no longer engaged by ball 811, spool bushing 830, spool 840 and spool gear 850 can be released and removed from shaft 310.

To insert a different sized spool 840, release pin 800 is again depressed, again permitting balls 811 to retract radially inward within guide holes 314 of shaft 310, permitting spool bushing 830, spool 840 of the new size and spool gear 850 to be slid onto shaft 310. When in place, the release pin 800 is released and spring 810 forces it outward. This causes the ball 811 to engage surface 822 of nut 820, drawing nut 820 forward and forcing balls 811 radially outward and into internal groove 1031 of spool bushing 830, securing the spool bushing 830, spool 840 and spool gear 850 against the reel housing 10.

As may be better seen in FIG. 11, a fishing reel 1100 may thus comprise the reel housing 10 with a line dispensing spool 840 mounted on the shaft 310 through central bore 1044. A fishing apparatus may comprise at least one fishing rod 1101 with a threaded mount 1102 and the fishing reel 1100 with the feet 102 of the rod mount 100 set within corresponding openings in the threaded mount 1102 of the at least one rod 1101.

As may be better seen in FIG. 11, a kit may be produced comprising the reel housing 10 and at least one line dispensing spool 840 having a central bore 1044 for mounting on the shaft 310. In some example embodiments, the kit may comprise the reel housing 10, a plurality of line dispensing spools 840 in the standard sizes and at least one rod 1101 having a threaded mount 1102. In some example embodiments, line 1103 or at least one fly 1104 and/or both may be added to the kit.

Those having ordinary skill in this art will appreciate that conventional fly reels have a cap (not shown) around the spool 840 to assist in reducing the likelihood of de-spooling of line for the spool. Such a cap is not present in the apparatus herein and it has been found that the absence of such a cap does not materially affect the likelihood of de-spooling in typical use.

According to a first broad aspect of the present disclosure there is disclosed a fishing reel housing for attachment to a rod along a longitudinal rod axis, the housing having a shaft for accepting a central bore of a line dispensing spool, and an adjustment mechanism for selectively adjusting the shaft in position transversely away from the rod axis while maintaining its longitudinal position along the rod axis.

According to a second broad aspect of the present disclosure there is disclosed a fishing reel comprising a fishing reel housing as described above, and a line dispensing spool having a central bore and mounted on the shaft of the fishing reel housing.

According to a third broad aspect of the present disclosure there is disclosed a fishing apparatus comprising at least one fishing rod having a mount to support a fishing reel thereon, and a fishing reel as described above mounted on the at least one rod.

According to a fourth broad aspect of the present disclosure there is disclosed a kit comprising a fishing reel housing as described above, and at least one line dispensing spool having a central bore for mounting on the shaft of the fishing reel housing.

While the present disclosure is sometimes described in terms of methods, the present disclosure may be understood to be also directed to various apparata including components for performing at least some of the aspects and features of the described methods, be it by way of hardware components or in any other manner. Such apparatus and articles of manufacture also come within the scope of the present disclosure.

The various embodiments presented herein are merely examples and are in no way meant to limit the scope of this disclosure. Variations of the innovations described herein will become apparent from consideration of this disclosure and such variations are within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combination will become readily apparent upon review of the present disclosure as a whole. The subject matter described herein and in the recited claims intends to cover and embrace all suitable changes in the technology.

Accordingly the specification and the embodiments disclosed therein are to be considered examples only, with a true scope and spirit of the disclosure being disclosed by the following numbered claims.

What is claimed is:

1. A fishing reel housing for attachment to a rod along a longitudinal rod axis, the housing having:
    a shaft configured to accept a line dispensing spool, the line dispensing spool having a central axis of rotation; and
    an adjustment mechanism for selectively adjusting the shaft in a direction transverse to the longitudinal rod axis and transverse to the central axis of the line dispensing spool while maintaining the shaft in its longitudinal position along the rod axis.

2. The fishing reel according to claim 1, wherein the adjustment mechanism provides positive locking to at least one predetermined position.

3. The fishing reel housing according to claim 2, wherein the position of the shaft relative to the rod axis in the at least one predetermined position corresponds to a radius of a standard size spool.

4. The fishing reel housing according to claim 3, wherein the shaft is selectively adjustable to a position to accept the standard size spool, the spool being selected from a group consisting of a 2-3, 4-5, 6-7 and 8-9 standard size fly spool.

5. The fishing reel housing according to claim 2, wherein the adjustment mechanism comprises at least one detent corresponding to the at least one predetermined position and a biasing element for engaging one of the at least one detents as the shaft is adjusted.

6. The fishing reel housing according to claim 5, wherein the biasing element is a ball plunger for forcing a ball against the at least one detent.

7. The fishing reel housing according to claim 1, wherein the adjustment mechanism comprises a track having an internal race and a rotatable stabilizer coupled to the shaft, the rotatable stabilizer having a plurality of legs for engaging the internal race.

8. The fishing reel housing according to claim 7, wherein the stabilizer legs all remain in contact with the internal race.

9. The fishing reel housing according to claim 7, wherein the stabilizer has at least three legs.

10. The fishing reel housing according to claim 7, wherein the stabilizer legs comprise a spacer for engaging the internal race.

11. The fishing reel housing according to claim 7, wherein the stabilizer legs comprise a bushing for engaging the internal race.

12. The fishing reel housing according to claim 7, wherein the adjustment mechanism comprises a rotatable dial coupled to the stabilizer for selectively adjusting the position of the shaft.

13. The fishing reel housing according to claim 12, wherein the stabilizer legs extend between the stabilizer and the rotatable dial and are fastened to the rotatable dial.

14. The fishing reel housing according to claim 12, wherein the rotatable dial bears markings corresponding to at least one predetermined shaft adjustment position.

15. The fishing reel housing according to claim 7, wherein the internal race comprises a plurality of convex arcs.

16. The fishing reel housing according to claim 15, wherein the internal race comprises a first convex arc and an opposed second convex arc of different curvature.

17. The fishing reel housing according to claim 15, wherein the arcs mutually terminate in at least two projections.

18. The fishing reel housing according to claim 17, wherein the at least two projections limit traversal of the internal race by the stabilizer legs.

19. The fishing reel housing according to claim 7, wherein the track contains at least one secondary bore.

20. The fishing reel housing according to claim 1, further comprising a rod mount configured for attachment to the rod along the longitudinal rod axis.

21. A fishing reel comprising:
    a fishing reel housing according to claim 1; and
    a line dispensing spool having a central axis and mounted on the shaft of the fishing reel housing.

22. A fishing apparatus comprising:
    at least one rod having a mount to support a fishing reel thereon; and
    a fishing reel according to claim 21 mounted on the at least one rod.

23. A kit comprising:
    a fishing reel housing according to claim 1; and
    at least one line dispensing spool having a central axis for mounting on the shaft of the fishing reel housing.

24. A kit according to claim 23, further comprising at least one fishing rod having a mount to support the fishing reel housing thereon.

25. A kit according to claim 23, further comprising fishing line for winding on at least one of the at least one line dispensing spools.

26. A kit according to claim 23, further comprising at least one lure.

27. The fishing reel according to claim 1, further comprising a spool release assembly.

28. The fishing reel according to claim 27, wherein the spool release assembly comprises a release pin depressable to release the line dispensing spool from the fishing reel housing.

29. The fishing reel according to claim 28, wherein the release pin is biased against being depressed.

30. The fishing reel according to claim 27, wherein the spool release assembly comprises a releasable lock between the shaft and the line dispensing spool.

31. The fishing reel according to claim 30, wherein the releasable lock comprises at least one ball displaceable from a seat on the shaft outwardly towards the line dispensing spool.

32. The fishing reel according to claim 31, wherein the seat on the shaft comprises at least one guide hole.

33. The fishing reel according to claim 31, wherein the line dispensing spool comprises a spool bushing sized to fit around the shaft.

34. The fishing reel according to claim 33, wherein the seat on the line dispensing spool comprises a groove on the spool bushing.

* * * * *